United States Patent Office 3,432,982
Patented Mar. 18, 1969

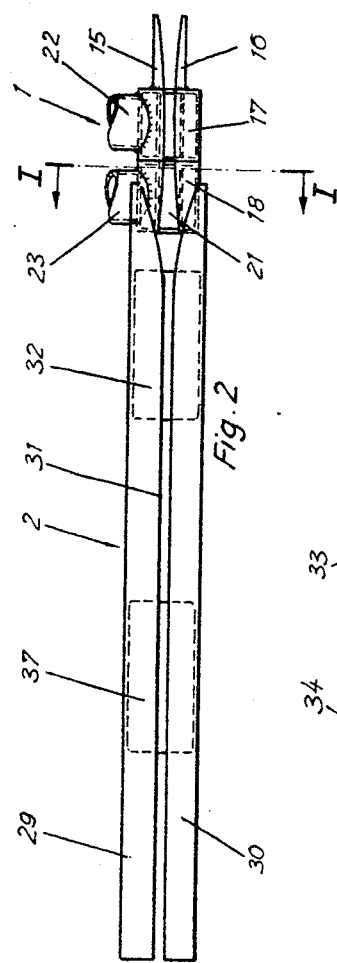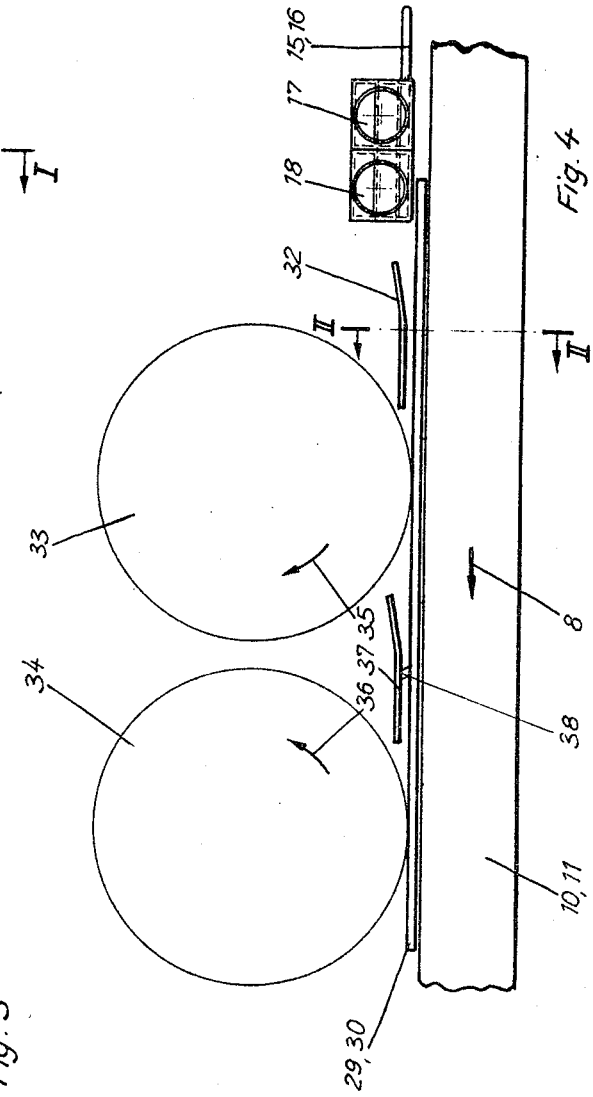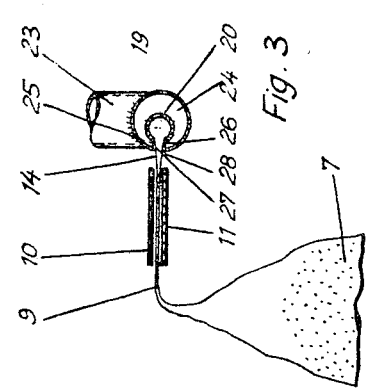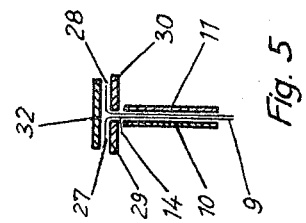

3,432,982
METHOD AND APPARATUS FOR APPLYING CLOSURE HEAT-SEALS TO FILLED PLASTIC BAGS
Friedhelm Brinkmeier, Ladbergen, and Dietrich Aulmann, Lienen, Germany, assignors to Windmoller & Holscher
Filed Sept. 15, 1965, Ser. No. 487,422
Claims priority, application Germany, Sept. 21, 1964, W 37,587
U.S. Cl. 53—40
Int. Cl. B65b 7/00, 17/00, 55/00
26 Claims

ABSTRACT OF THE DISCLOSURE

Method and apparatus for applying closure heat-sealed seams to filled plastic bags comprising spreading apart the edges of the open end of a filled bag by a vacuum device, removing a thin full-face material layer from the inner surface of the edges so that fresh material is exposed to form a seal, placing the edges of the bag into contact with each other and then heat sealing the edges of the bag.

---

When using closure machines for filled plastic bags which close the open filling end of the bags by a heat seal, it has been found that these heat-seal seams do not satisfy the demands made with respect to strength, since they are not of the quality of the heat-seal seams applied at various other areas of the bag. The defective quality of the closure heat-seal seams is due to the fact that during the filling process, dust from the material being filled settles on the bag walls to be heat-sealed, which prevents a dependable seal to be effected. Moreover, the dust of certain materials has such an effect that the application of closure heat-seals to bags filled with such materials is not possible at all.

In order to be able to apply dependable closure seals to filled plastic bags, applicants at first attempted to blow or brush away the dust of the material with which the bag is filled from the inner surfaces of the bag edges to be sealed together. Upon the filling or opening of the bag or upon prior operations, however, an electrostatic charging of the parts of the sheet to be sealed together occurs which, in combination with adhesive forces, results in dust adhering very firmly to the inner surfaces of the bag, rendering it impossible to effect the entire removal of same with the above-mentioned methods.

In order to remedy these difficulties, it has already been proposed to bring the sheet surfaces to be heat-sealed to each other into contact prior to the heat-sealing with electric charge carriers, and in this way effect a neutralizing or non-uniform charging of the surfaces to be heat-sealed together. This was done since it was believed that the electrical transverse forces caused by the charge of the same sign produced on the inner surfaces of the edge, as a result of separation of charge upon the filling process or upon opening, prevented a dependable flowing together of the molecules upon the fusion process.

Further experiments, however, showed that, in this way, a satisfactory quality of the closure heat-seals could not be obtained any more than in accordance with still another proposal in which the electrostatic forces of attraction between the particles of dust and dirt and the surfaces of the sheets were eliminated by neutralization thereof, and the particles of dust and dirt then brushed away. Nor has it been possible to achieve success in a further proposal in which the edge portions of the bag at the open end are folded back onto one of the side walls of the bag and a heat-seal seam applied thereto which covers a total of 4 layers, and which was not stressed in tension, but only in shear in the outer layers. This proposal was objectionable in that a relatively large part of the sheet material of the bag is lost as material which can be used for forming the inside of the bag.

The object of the present invention is to overcome the objections of the above proposals and, more particularly, to make it possible to apply closure heat-seals to filled plastic bags in all cases by substantially improving the quality of the heat-seals produced heretofore by sealing after the blowing or brushing off of a part of the dust coming from the filling material.

In accordance with the invention, this result is obtained in the following manner: the bag edges dirtied by the dust of the material and adhering to each other are initially spread apart at the open end in order to make their inner surfaces accessible to treatment, the inner surfaces are freed of dust and dirt by full-surface rubbing with considerable pressing pressure, and the bag edges are then placed against each other and heat-sealed together. It is particularly advantageous if the dust from filling material is, in accordance with the invention, rubbed or ground away from the inner surfaces of the spread bag[1] so as to be certain that all foreign matter is removed from the inner surfaces. Before the rubbing or grinding off the dirt or dust which is only loosely adherent, and in particular the coarse dirt, can be brushed off from the inner surfaces in order to prevent excessive dirtying of the means for subsequently rubbing or grinding off the more strongly adhering fine dust.

Before the bag edges, which have been spread apart and cleaned of the dust of the material, are against placed together and the closure weld-seam obtained, it may be advantageous, in accordance with a further embodiment of the invention, to preheat the inner surfaces of the sheet edges which are spread apart so that the final application of the closure heat seal takes place more rapidly after the edges have been placed together. This applies as well to the heat sealing of sheets which are not dirty and which have not been previously cleaned.

In this way, it is possible to construct the welding station shorter, which is an advantage in particular where space is at a premium. In accordance with the invention, it is particularly advantageous if the heating of the inner surfaces of the edges of the sheet is effected by a heated stream of air, since this simultaneously maintains the spread apart position of the sheet edges and thus effects the heating directly on the surfaces which are subsequently to be sealed together. Since, in this connection, heating can be effected readily at the same time by radiation and convection, more calories can be supplied per unit of time than in the case of pure heating by radiation, which also would require other means for spreading the edges of the sheets apart. Since the plastics used for the production of plastic bags, for instance polyethylene, have a poor thermal conductivity, the action of the heat directly on the surfaces to be sealed together is particularly saving in time and energy. In this manner a predetermined temperature can be obtained substantially faster on these inner surfaces than if the heat must pass through the entire thickness of sheet in order to arrive at the inner surface. In a further development of the invention, the stream of air serving for the preheating of these inner surfaces can, to particular advantage, be heated by the waste heat produced upon the subsequent heat-sealing process. Upon leaving the heating station, the heated inner surfaces of the sheet edge parts can be pressed against each other with the application of considerable pressure so that an initial connection is already produced between the two heated inner surfaces of the bag edges.

In accordance with another proposal of the invention,

---

[1] By removing a thin surface layer thereof.

the inner surfaces of the bag edges can be heated in a region which extends beyond the area of the bag from which the dust of the material has been removed. Therefore, while the two plastic sheets are heat-sealed to each other in the cleaned region, they are not sealed to each other in the region which, while heated, has not been cleaned. Upon the cooling of the heated heat-sealed bag edges, which is effected after the application of the clusure heat-seal, the plastic sheets shrink together in the unclosed region resulting in greater strength in a region which directly adjoins the closure heat-seal. In this way, the zone of a plastic bag which experience shows to be the weakest, namely that part which lies at the transition between the heat seal and the untreated plastic sheet, is strengthened.

One apparatus for the carrying out of the method of the invention is characterized by a spreading device for the bag edges, a rubbing device provided with a rotating rubbing surface, and a sealing device for the bag edges which are placed together again after the rubbing.

The spreading of the bag edges can be effected in a particularly simple and dependable manner by having the leading bag edge travel against a stop. The bag edges which are spread in this manner can then be passed below a rail adapted to maintain them open, which rail is arranged over two guide-and-abutment rails, so that the bag edges are passed in a spread condition up to the cleaning device.

In accordance with a particularly preferred embodiment of the invention, the spreading can also be effected by the drawing-in of the two bag edges through opposing slot-shaped openings of a plurality of vacuum conduits, the distance between which increases more and more in the direction of the path of the movement of the filled bags. Such an arrangement avoids the use of suction cups which must be continuously moved during operation, which require relatively expensive drive means, and which are subject to wear. It is advantageous if, for each of the two bag edges, two or more vacuum slots or vacuum chambers are connected behind each other and have independent vacuum lines associated with them. Since the vacuum will only be fully effective after the suction nozzle is entirely closed by the bag edge which is to be drawn in, a single, correspondingly longer vacuum slot would have to be connected to a very strong vacuum pump. The latter would, however, only become active when the bag end extends along the entire slot. By the provision, in accordance with the present invention, of two or more short slots, one behind the other, a substantially earlier opening action on the bag end is assured. The opening station of the machine in accordance with the invention can also be used if subsequent cleaning and/or heat sealing is not intended, but rather the spread-apart edges of the bag are, for example, to be glued to each other. The opening station of the invention is therefore inventive by itself, even independently of the above-described other features of the invention, and further development of it can be employed with particular advantage.

In the cleaning station, there is provided, in accordance with the present invention, a rubbing disk or a circulating rubbing belt having a suitable frictional surface on its periphery or on its outer surface. This disk may consist entirely of a strong felt, while a friction lining is applied to the circulating rubbing belt when used. Emery paper may be used for this friction lining, as well as the frictional surface of disk shape cleaning bodies. However, the use of emery paper causes a greater formation of dust in the cleaning process than do felt disks. The cleaning devices must act with considerable pressing pressure against the sheet edges to be cleaned, and in case of a large amount of dirt, they must also, by suitable selection of the pressing pressure, remove a thin surface layer from the inner surfaces of the bag edges. It is advisable to drive the cleaning body in a direction of rotation opposite the direction of conveyance of the bags so that the dust produced upon the rubbing or grinding off cannot be thrown again onto the cleaned bag edges moving forward or onto the adjacent working stations. In the event that a plurality of cleaning devices are utilized at the cleaning station, the last cleaning device in the direction of conveyance of the bags should be directed in a similar manner. It is also particularly advisable if the rotating bodies, which have a direction of rotation opposite the direction of conveyance of the bags, are arranged eccentrically. In this way, when the high speed rotary body is lifted off for a short time, the sheet material can always be jerked forward so that the bag edges to be worked do not have any further movement interfered with, despite the opposite direction of rotation of at least the last cleaning body.

In order to remove the coarse and loosely adherent dirt, a rotating brush can be arranged in front of the actual rubbing body in the cleaning station in order to prevent any unnecessary soiling of the rubbing surface of the rubbing body proper. Between every two cleaning bodies, there is also provided, in accordance with another development of the invention, another holding-open plate in order to maintain the bag edges spread apart upon passage from one cleaning body to the next.

As already mentioned, instead of the cleaning bodies being developed as rotating disks, a cleaning belt can also be provided which has a rubbing surface consisting, for example, of emery, felt or foam. The cleaning belt, which is guided over rollers, is in surface contact with the inner surfaces of the bag edges over a path which is as long as desired. This is in contradistinction to the cleaning disk, the full-surface contact of which with the material of the bag is restricted to a relatively narrow strip seen in the direction of conveyance and which, therefore, in order to obtain a good cleaning action, must rotate with relatively high speed of rotation. Since the cleaning belt thus acts on the inner surfaces of the edges of the bags over a larger area, it can rotate with considerably lower speed than the cleaning disks.

In the cleaning station, there are preferably also provided means for cutting the corner flaps formed upon the spreading apart of the edges of the bag. If a cleaning brush is present, it may be utilized to slit the corner flaps. In the event that the rear corner flap is not slit by the cleaning brush, as can occur in particular in the case of thicker material, a suitable cutting knife can be provided. This knife can be fastened, for example, to the open-holding plate lying between the two cleaning bodies.

In the preheating station, which may be provided independently of the cleaning station, heating elements are provided on both sides of a stream of air directed against the opening bag edges. The stream of air serves not only for the preheating, but also for simultaneously holding the bag edges in their spread position since an open-holding plate can no longer be used in the preheating station. Also the preheating is to take place directly on the inner surfaces of the bag edges which lie opposite each other. In a particularly suitable embodiment of the invention, the stream of air serving for the preheating can initially be passed through a conduit arranged behind the heat-sealing elements of the heat-sealing station in order to take up the heat which is radiated from the latter. The stream therefore enters the preheating station at elevated temperature. Therefore, a correspondingly smaller amount of energy is required to bring the stream of hot air to a given temperature in the preheating station.

In addition to the above, there are preferably provided in the preheating station, a plurality of additional radiation heating bodies, the heat rays of which are directed in particularly suitable fashion against a hollow mirror from which they are reflected and conducted onto the inner surfaces of the spread bag edges. An opening is provided in the center of the hollow mirror for the stream of hot air which is not prevented, either by the hollow mirror nor by the radiation heating elements, from coming against the bag edges which are to be preheated. As a result of the reflection of the heat rays on the hollow mirror, the radiation heating elements can, for example, be arranged along the path of the spread bag edges or at some other place which would otherwise remain unused. The opening in the hollow mirror serves for the passage of the heated stream of air and may be provided with sheet metal walls which converge in a direction toward the bag edges in order to direct a stream of air by the nozzle thus formed against the preheating point with particular accuracy.

Between the preheating station and the heat-seal station, pressure rollers for the heated inner surfaces of the sheets may be provided. By use of these rollers the bag edges are placed against each other, and bonded as a result of the pressing pressure at the preheated inner surfaces. As a result of the presence of the preheating station, the following heat-seal station can be considerably shorter. The heat-seal station itself can be developed in any desired known manner and, as already mentioned, is provided to particular advantage with an air duct. The latter is placed behind the heat-seal elements and the stream of preheating air flowing in said duct acts as a stream of cooling air at the heat-seal station. Preferably, behind the heat-seal station there is located a cooling and pressing station in which the heat-sealed bag edges are passed by means of steel belts between cooling bodies traversed by a suitable coolant, so that the heat-seal seam formed at the bag edges is pressed together and at the same time cooled.

The present invention will be explained below on basis of an embodiment, shown in the drawing, of a heat-seal machine for the closing of filled plastic bags. In the drawings:

FIG. 2 is a front elevation of the opening station and of the cleaning station of the apparatus of FIG. 1, FIG. 3 is a transverse section along the lines I—I of FIG. 2, FIG. 4 is a top view of the opening station and cleaning station of FIG. 2;

FIG. 5 is a transverse section along the line II—II of FIG. 4,

Figure 1:
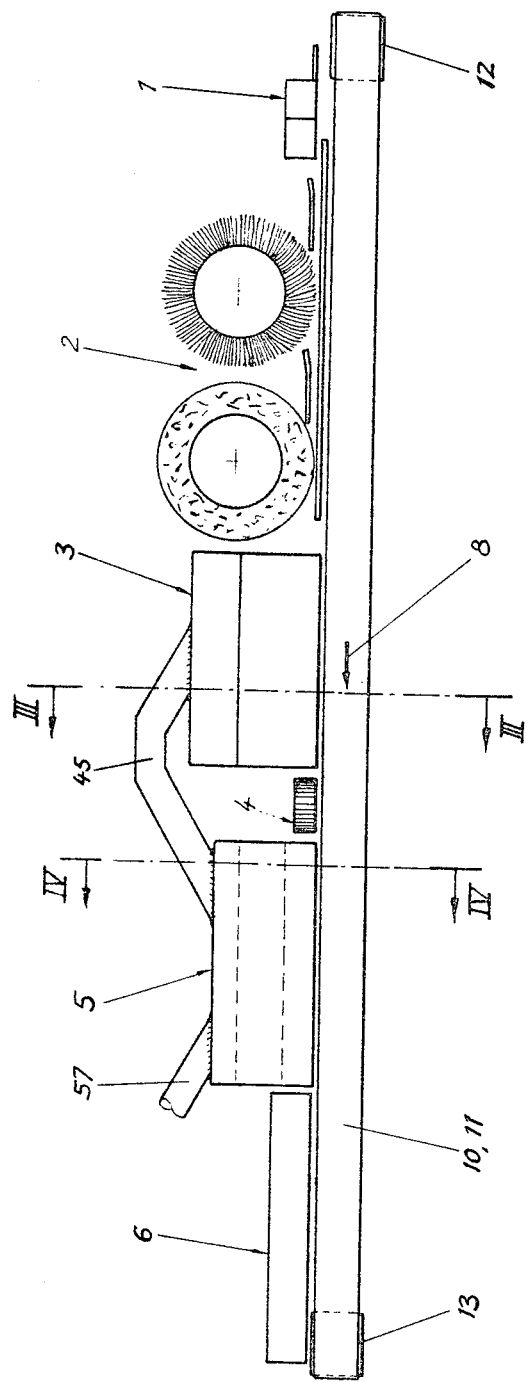
FIG. 1 is a top view of the apparatus of the invention, shown schematically.
Figure 6:
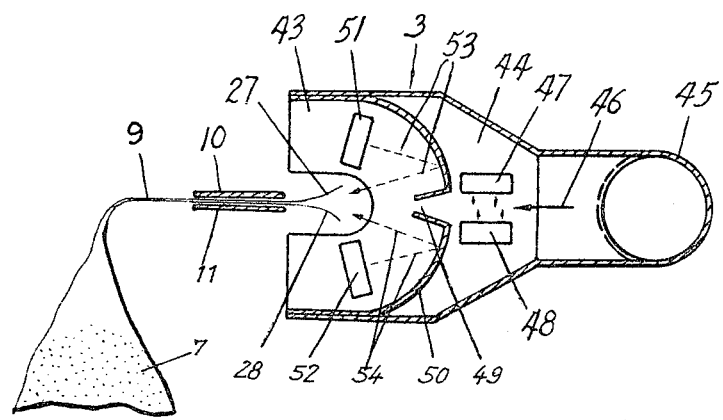
Figure 7:
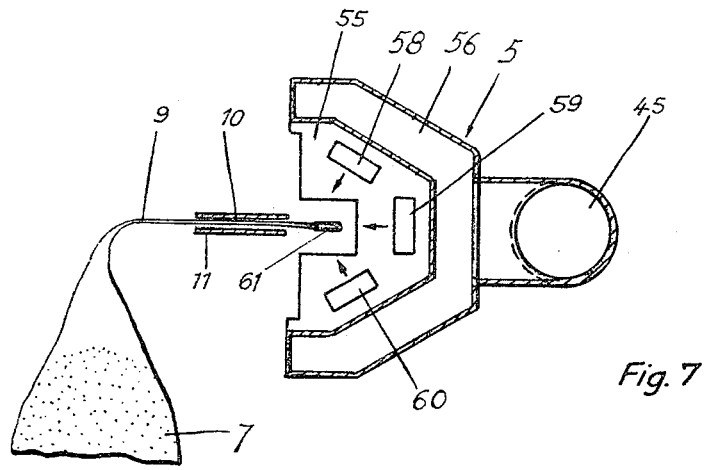
Figure 8:
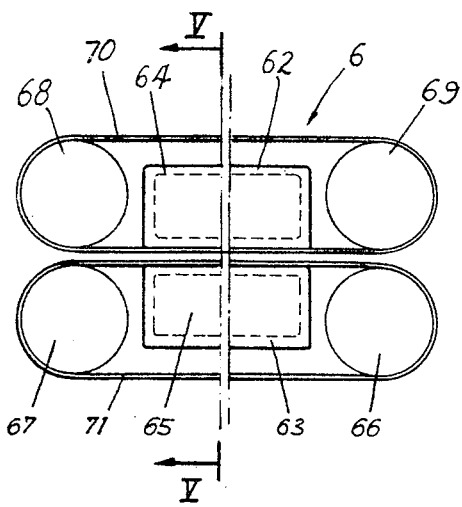
Figure 9:
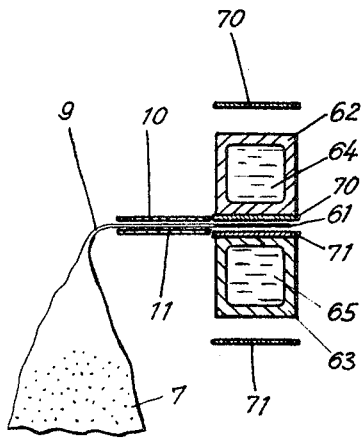
Figure 10:
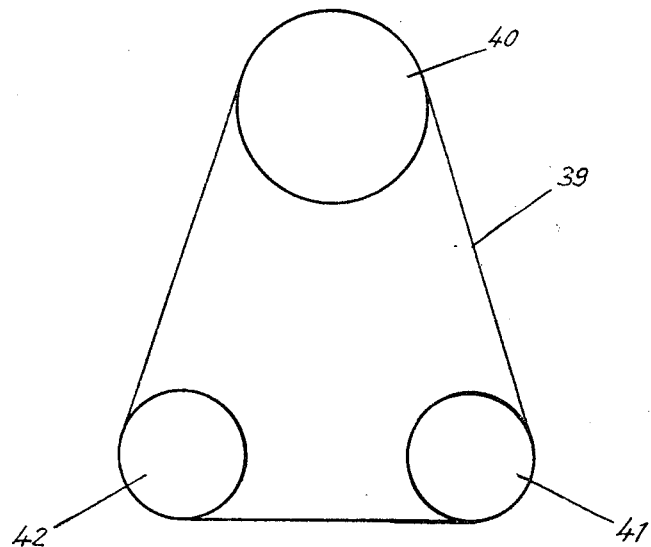

FIG. 6 is a transverse section along the line III—III of FIG. 1 through the heating station of the invention, FIG. 7 is a transverse section along the line IV—IV of FIG. 1 through the heat-seal station of the apparatus in accordance with the invention, FIG. 8 is a front elevation of the pressing and cooling station of the apparatus of FIG. 1, FIG. 9 is a transverse section along the line V—V of FIG. 8, and FIG. 10 is a front elevation of another embodiment of the cleaning station of the invention.

The apparatus for applying closure heat-seal seams to filled plastic bags is shown schematically in FIG. 1 and consists of an opening station 1, a cleaning station 2, a heating station 3, a pressing station 4, a heat-sealing station 5 and a pressing and cooling station 6. The filled plastic bags 7 (shown broken off in FIGS 3, 6, 7 and 9 of the drawings) rest via their lower end (not shown) on a conveyor belt which moves in the direction indicated by the arrow 8. The head end 9 of the bags is to be closed by heat-sealing and is bent over into a horizontal plane. The sides of the bag to be connected together can therefore be brought more easily against each other in a straight plane.

Referring to FIGS. 2–5, it is seen that protruding end 14 of the bag end 9 which is to be closed is held and guided between two conveyor belts 10 and 11, also moving in the direction indicated by the arrow 8, and traveling over pairs of rollers 12 and 13. The protruding bag piece 14 is brought between the resting rails 15 and 16, and arrives on same in the opening station 1 which consists of two vacuum chambers 17 and 18. The vacuum chambers 17 and 18 are each formed of two pipes 19 and 20 inserted in one another and are provided with a slot 21 which widens in the direction indicated by the arrow 8. Via connecting pipes 22 and 23, the vacuum chambers 17 and 18 are in communication with vacuum pumps, not shown. The actual vacuum chambers have the shape of an annualar space 24 formed by the two pipes arranged one within the other, the annular space being in communication with the outer air at its openings 25 and 26 formed by the slot 21. As a result of the vacuum prevailing in the annular space 24, the edges 27 and 28 of the bag piece 14 are drawn against the openings 25 and 26 and thus opened. A strong adherence of the bag edges 27 and 28 to each other as a result of electrostatic charging of the material of the bag and dirtying by the dust of the material filled in the bag can be easily overcome by selection of a suitably larger vacuum in the annular space 24. The bag edges 27 and 28, once they have been drawn open and moved upon passage through the opening station along the openings 25 and 26, are opened furthest upon leaving the opening station 1, since here the distance between the openings 25 and 26 is the greatest as a result of the widening of the slot 21.

Immediately after leaving the opening station, the opened bag edges 27 and 28 come into the region of two guide rails 29 and 30 of the cleaning station 2, which rails are arranged spaced above one another (FIG. 2). The protruding bag end 14 is guided in the gap 31 located between the guide rails 29 and 30 while the bag edges 27 and 28, which have been drawn open by the suction, after entering slot 31 which widens toward the opening station, pass into the region of a guide plate 32. This plate is bent opposite the direction of the arrow 8, and causes the bag edges 27 and 28, which have already been opened, to be pressed against the guide rails 29 and 30 and thus brought into a position which can be noted particularly easily from FIG. 5. In this position the treatment of the inner surfaces of the bag edges by the cleaning body provided behind same is possible.

The cleaning station 2 shown in the embodiment is provided with two cleaning bodies 33 and 34 (FIG. 4). The cleaning body 33 may be, for example, a brush in the form of a rotatable disk and the cleaning body 34 may consist of a rotatable felt disk. The brush 33 and the felt disk 34 preferably turn in the direction indicated by the arrows 35 and 36 so that the dust produced during the cleaning of the opened bag edges 27 and 28 can be thrown out between them or drawn in by a suction device, not shown. In this way, one avoids dirtying the opening station 2 or the heating station 3 with the resultant dust. As soon as the opened bag edges 27 and 28 leave the region of the guide plate 32, they pass into the region of the brush 33 which is rotating at high speed, the loosely adhering dust of the filling material thus being brushed off from the inner surfaces of the bag edges. The first cleaning body, which in the present example is brush 33, also has the job of slitting the front and rear corner flaps of the bag edges during the cleaning so that these corners of the inner surfaces also are treated by the cleaning bodies. After leaving the brush 33, the bag edges are again pressed back by another guide plate 37 so that their inner surfaces can also be treated by the felt disk 34 which rotates at a relatively high speed. The guide plate 37 may be provided with a knife 38 which serves to slit the rear corner flap of the spread bag edges if this operation is not performed by brush 33. This, however, occurs only in the case of relatively strong sheet material, so that the knife 38 can be dispensed with in most cases. This is particularly due to the fact that the first corner flap, even in the case of stronger sheet material, is always slit, due to the direction of rotation of the brush 33 as indicated by the arrow 35. By the felt disk 34, even dust of the material which is firmly adherent to the inner surfaces of the bag edges is completely rubbed off. In case of a particularly large amount of dirt, it may be necessary to grind off a thin surface layer from the inner surfaces.

Instead of the cleaning disks 33, 34 shown in FIG. 4, there can also be provided a cleaning belt 39 shown schematically in FIG. 10. The cleaning belt 39 consists, for example, of a foam-bonded flat belt which travels over rollers 40 to 42. Due to the fact it acts on a larger area of the inner surfaces to be cleaned, it can travel with considerably lower speed than the cleaning disks 33, 34 and the dust developed during the cleaning is thus less in the former case than in the latter.

The bag edges 27 and 28 which have been cleaned in the cleaning station 2 then pass into the heating station 3 in which their inner surfaces are heated in order to accelerate the final application of the heat-seal in the heat-seal (welding) station 5. The heating station 3 (shown in cross-section in FIG. 6) consists of two heating chambers 43 and 44 which are in communication with each other. The heating station 3 is connected with the heat-seal station 5 by a pipe 45, the latter also being shown in FIG. 1. A preheated stream of air coming from the heat-seal station 5 is conducted through the pipe 45 into the heating chamber 44 and moves in the direction of the arrow 46 between two heating bars 47 and 48 through the heating chamber 44. In this way, the temperature of the stream of air is increased by the heating bars 47, 48 which give off their heat rays, as indicated by arrows, in the direction towards the stream of air passing between them. The wall 50 of chamber 43 is developed in the manner of a hollow reflector, and the hot stream of air passes through hole 49 in said wall, into said chamber, and then to the inner surfaces of the spread bag edges 27 and 28 so that the latter are heated. The bag edges 27 and 28 which are spread open entrance into the heating station are thereby held in opened condition by the stream of air directed against their inner surfaces. The bag edges can therefore be heated at any time from their inner surfaces so that, as a result of the poor thermal conductivity of the plastic sheets, a given temperature at the inner surfaces of the bag edges can be more easily obtained than if the heat had first to pass through the entire sheet to arrive at the inner spaces.

In the heating chamber 43, there are two additional heating elements 51 and 52, the heat rays of which are emitted onto the wall 50 which is developed in the form of a hollow mirror. These rays are reflected by the mirror in such a manner that they are directed against the inner faces of the bag edges 27 and 28 (see the arrows 53 and 54 indicating the direction of the heat rays). In this way, the heating action of the hot stream of air is reinforced.

Thus, upon their passage through the heating station 3, the inner faces of the bag edges 27 and 28 are heated in a region extending beyond the cleaned zone of the bag edge. In this region of the bag, the bag material shrinks together upon subsequent cooling so that the plastic sheets are imparted higher strength in an area which directly adjoins the closure seam, so that a tearing of the filled plastic bags at this point, which experience shows to be the most susceptible to tear, is avoided.

The heated, spread bag edges 27, 28 upon leaving the heating station 3 are pressed together between two rollers which form the pressing station 4 (FIG. 1) so that in the cleaned region of the edges an initial connection between the inner surfaces thereof has already taken place.

From the pressing station 4, the bag edges 27 and 28, which are now pressed together, pass to the heat-sealing station 5 in which the filled bags are imparted a closure heat-seal which is formed by remelting the bag edges 27 and 28. The heat-seal station 5 is shown in cross-section in FIG. 7 and consists of the heat-seal space 55 and a cooling space 56. By means of a pipe 57 (FIG. 1), the cooling space 56 is in communication with a blower (not shown) from which cool air flows into the cooling space 56. The cool air is heated by the heat given off by the heat-seal space 55 and then flows through the pipe 45 into the heating station 3 where, as already described, it heats the bag edges 27, 28. In the heating space 55, there are arranged three heating elements 58 to 60 which can be switched in stages in order to adapt the heat-seal heat to the thickness of the plastic sheets to be sealed together. The heat rays of the heating elements, as indicated by arrows, are directed against the bag edges 27, 28 to be sealed together. Under the action of the heat radiated by the heating elements 58 to 60, the bag material is remelted, resulting in the two bag edges 27, 28 being intimately connected with each other. A closure heat-seal seam 61 is then formed.

In order to strengthen the heat-seal seam 61, it is necessary to compress and cool it. The cooling is preferably effected during the compressing in order to accelerate the strengthening process. The pressing and cooling station 6 (FIGS. 8 and 9) is provided for simultaneously carrying out the compressing and cooling and consists of two steel rails 62 and 63 arranged one above the other, whose cavities 64 and 65 are traversed by a cooling liquid, such as water. By means of two steel belts 70 and 71 traveling over rollers 66 to 69, the bag edges, which are sealed together to form the heat-seal seam 61, are passed between the steel rails 62, 63, so that the heat-seal seam 61 is compressed into the shape shown in FIG. 9 and simultaneously cooled.

The closure heat-seal seam thus produced is, for the first time, of a quality comparable to that of seams in other portions of the bag.

What is claimed is:

1. A method of applying closure heat-seal seams to filled plastic bags, comprising the steps of spreading apart the edges of the open end of the bag, removing a thin full-face material layer from the inner surfaces of said edges, placing said edges together, and heat-sealing said edges to each other.

2. The method of claim 1 further comprising the step of brushing away loose dust and dirt from the inner surface of the bag edges before said rubbing step.

3. The method of claim 1 further comprising the step of preheating the inner surfaces of said spread apart edges, and carrying out the heat-sealing of said edges to each other by directing heat from outside said bags to said edges.

4. The method of claim 3 wherein said step of preheating is effected by a heated stream of air.

5. The method of claim 4 wherein said heated stream of air is heated by the waste heat produced by said heat-sealing step.

6. The method of claim 3 further comprising the step of pressing said edges together by use of an external pressure after said pre-heating step.

7. The method of claim 3 wherein said edges are preheated over a larger area than that from where the material has been removed.

8. An apparatus for applying closure heat-seal seams to a plurality of filled plastic bags moving over a fixed path comprising a spreading device for spreading the bag edges, a first rotary cleaning device, and a second rotary device adapted to remove a thin full-face material layer from the inner surfaces of said edges, and a heat-sealing device for sealing said edges together after they have been rubbed, each of said devices being disposed in said path at predetermined intervals.

9. The apparatus of claim 8 further comprising a means for opening and spreading a bag corner, said means being disposed in said path.

10. The apparatus of claim 8 further comprising two guide and abutment rails to guide said bags over rail path, and an open-holding rail disposed adjacent said guide and abutment rails to hold the spread edges of the bag apart.

11. The apparatus of claim 8 wherein the spreading device includes at least one vacuum conduit disposed in the path of said bags and having two slot-shaped openings opposing each other and extending in the direction of said path, the distance between which increases in the direction of said path of movement, said edges being drawn against said openings and spread apart a distance corresponding to the distance of said openings.

12. The apparatus of claim 11 wherein at least two vacuum conduits are disposed one behind the other in said path, each conduit being connected to an individual vacuum pipe.

13. The apparatus of claim 8 wherein the cleaning station comprises a rubbing disc having a frictional surface consisting of a strong feltlike material.

14. The apparatus of claim 8 wherein the cleaning station comprises a circulating rubbing belt having a friction lining consisting of foam material.

15. The apparatus of claim 8 wherein the cleaning device most remote from the bags as they begin said travel is driven in a direction of rotation opposite from the direction of travel of said bags.

16. The apparatus of claim 15 wherein said remote cleaning device is eccentrically supported.

17. The apparatus of claim 8 wherein said cleaning device further comprises a rotating brush disposed adjacent said rubbing surface.

18. The apparatus of claim 17 further comprising a plate adapted to maintain said edges spread apart, said plate being disposed between every two cleaning devices.

19. The apparatus of claim 8 wherein said cleaning device further comprises cutting means to cut the corner flaps of said bag edges.

20. The apparatus of claim 19 wherein said cutting means comprises a cutting knife disposed on said plate.

21. The apparatus of claim 8 further comprising a device to pre-heat said bag edges prior to the heat-sealing thereof, said device being disposed in said path and comprising means to direct a stream of air against said bag edges, and a plurality of heating elements in the path of said air and adapted to heat said air.

22. The apparatus of claim 21 wherein said stream of air is supplied from the heat-sealing device.

23. The apparatus of claim 21 wherein said pre-heat device further comprises a hollow mirror having an opening for said stream of air, and a plurality of radiation heating members, the heat rays of which are directed against said mirror, reflected and conducted onto the inner faces of said bag edges.

24. The apparatus of claim 23 wherein said mirror opening is provided with convergent sheet-metal walls directed toward the bag edges.

25. The apparatus of claim 21 further comprising at least two pressing rollers disposed in said path between said pre-heating device and said heat-sealing device and adapted to press said bag edges together.

26. The apparatus of claim 8 further comprising means to cool and press edges after they have been heat-sealed.

References Cited

UNITED STATES PATENTS

| | | | |
|---|---|---|---|
| 1,276,452 | 8/1918 | Tuck | 53—167 X |
| 2,156,441 | 5/1939 | Watson et al. | 53—39 |
| 2,691,474 | 10/1954 | Olson | 53—39 |
| 2,822,653 | 2/1958 | Zinn et al. | 53—373 |
| 3,140,571 | 7/1964 | Dorper et al. | 53—373 X |
| 3,200,557 | 8/1965 | Schwenk | 53—373 X |
| 3,248,843 | 5/1966 | Winters et al. | 53—39 |
| 3,286,433 | 11/1966 | Johnson et al. | 53—39 |

FOREIGN PATENTS 963,076 7/1964 Great Britain.

TRAVIS S. McGEHEE, *Primary Examiner.*

ROBERT L. FARRIS, *Assistant Examiner.*

U.S. Cl. X.R.

53—167, 373; 156—153, 583